United States Patent

[11] 3,629,074

[72] Inventor Teruo Okubo
Tokyo, Japan

[21] Appl. No. 764,993
[22] Filed Oct. 4, 1968
[45] Patented Dec. 21, 1971
[73] Assignee Eisai Kabushiki Kaisha
Tokyo, Japan

[54] EVALUATION OF STERILIZING POWER OF DISINFECTANTS AGAINST HOG CHOLERA VIRUS
1 Claim, No Drawings

[52] U.S. Cl. .......... 195/103.5 R, 195/1.2, 195/1.4, 424/89
[51] Int. Cl. .......... C12k 1/06, C12b 3/16
[50] Field of Search .......... 195/103.5 R, 1.2, 1.4; 424/89; 167/80

[56] References Cited

OTHER REFERENCES

Biological Abstracts, Vol. 37 (1962), Abstracts 6,667 and 6,671 QP501 B615.

*Primary Examiner*—A. Louis Monacell
*Assistant Examiner*—James R. Hoffman
*Attorney*—Wenderoth, Lind and Ponack

ABSTRACT: This invention is concerned with a method for the accurate estimation of sterilizing power of antiseptics against hog cholera virus. The method of the present invention is effected by determinating of the critical and least concentration of a given disinfectant in its sterilizing liquor at which the disinfectant still shows sterilization power sufficient to kill the active hog cholera virus. The absence of the active hog cholera virus after the treatment with such diluted liquor may be confirmed by observing when no more metamorphic destruction of the tissue of hog occurs when the tissue is exposed to the treated hog cholera virus in the presence of the virus of Newcastle disease. The method of the present invention may also be applied for comparison of relative sterilizing powers of the various disinfectants available on the market.

EVALUATION OF STERILIZING POWER OF DISINFECTANTS AGAINST HOG CHOLERA VIRUS

This invention relates to a method for the estimation in vitro of sterilizing power of a given disinfectant on hog cholera virus.

More particularly, the sterilizing power of the disinfectant on hog cholera virus is determined according to the method of the present invention by observing the point of the disappearance of hog cholera virus in a nutritious medium inoculated with active hog cholera virus after the medium was treated with the said disinfectant at the lowest effective concentration.

Such lowest concentration as that above-mentioned can be determined in accordance with the process of the present invention by utilizing the phenomenon that cellular tissue of the testicle or kidney of a hog is destroyed when the tissue is exposed to the hog cholera virus in the presence of the virus of Newcastle disease.

Hog cholera, as is well known, is a fatal disease to pigs. All over the world, numerous pigs every year are damaged with this disease which is a decisive obstruction in swine-keeping.

Since no particular veterinary medicine for treatment of hog cholera has been yet found, it is necessary to frequently apply vaccinations and/or discriminately make use of various disinfectants available in the market in order to prevent the infection from reaching epidemic stage.

Moreover, because of the lack of a decisive method for determination of the sterilizing power of a given disinfectant on hog cholera virus, it is presently necessary that an antiseptic agent be arbitrarily chosen from the group of known disinfectants commonly employed without consideration of their true disinfectant ability.

The present invention, as is aforementioned, is based on the fact that cellular structure of the tissue of testicle or kidney of pig is considerably metamorphosed when it is treated with hog cholera virus in the presence of the virus of Newcastle disease, despite the fact that each of these viruses alone does not have any metamorphic effect on the tissue.

It is notable that the available disinfectants within certain concentrations such as those conventionally employed for the purpose of sterilization unexceptionally exhibit more or less a metamorphic action on the tissue in addition to their sterilizing action on hog cholera virus. Under these circumstances, it is obvious that the share of the effect of metamorphic destruction of the tissue caused by the hog cholera virus per se coexistent with virus of Newcastle disease can not be determined.

In carrying out the novel method of the present invention, it is therefore essential to find at first the critical concentration of a given disinfectant at which no more metamorphic destruction of the tissue when treated therewith occurs. This is performed according to the present invention by the following consecutive procedures.

a. A series of the aqueous solutions having predetermined systematically varied concentrations of a given disinfectant contained in vessels, such as test tubes made of glass, are prepared by diluting regularly the original stock concentrate of the agent.

b. A fresh aqueous suspension of the tissue is prepared in accordance with the procedure disclosed in the first paragraph of the following example.

c. Each 0.5 ml., for example, of the fresh suspension of tissue thus obtained is added to each 0.5 ml. of the series of aqueous solutions prepared as described above in a.

d. The mixtures are separately cultivated by a slant static cultivation for 48, 96 and 120 hours, for example, at a temperature of 30° C. to produce a sheet of tissue on the interior wall of the respective test tubes.

e. At the ends of the aforementioned cultivation times, the status of the sheets that have been contacted with varying concentrations of disinfectant, are microscopically inspected under 50 x magnification. From the results, the critical and least concentration is found at which no metamorphic destruction of the sheet occurs.

Data on the critical concentrations of same typical disinfectants are listed in table 1 are given in table 2 mentioned below.

Now, the estimation of the sterilization power of the contemplated disinfectant is conducted as follows.

i. A series of the solutions in the test tubes having systematically different concentrations of the disinfectant previously prepared in accordance with the process given in the above paragraph a) are respectively inoculated with a highly active hog cholera virus.

ii. The solutions thus contaminated with the virus are diluted to the concentrations corresponding to at least the critical concentrations previously acknowledged in the above paragraph 3).

iii. Portions of the fresh suspension of the tissue previously prepared in accordance with the process given in the above paragraph b) are respectively added to the diluted solutions of ii, and are held for a time sufficient to secure a formation of sheet on the inner side of the individual test tubes.

iv. The active virus of Newcastle disease is added to each of the test tubes with or without decontation of the liquor content thereof and the whole are kept for a certain time at ambient temperature.

v. The conditions of the respective sheets are then microscopically inspected under 50 x magnification and are correlated with the corresponding concentration or dilution, in order to obtain the critical and minimum concentration of the contemplated disinfectant, which is still effective to prevent the metamorphic destruction of the sheet of tissue. No change in the appearance of the sheet proves the absence of the added active hog cholera virus due to exhaustive sterilization effect.

The following example will serve to fully understand the nature of the present invention:

EXAMPLE

A. Estimation of Effect on cellular Tissue of some typical Disinfectants available on the Market Substantial parts of a testicle obtained by excision from pig of eight months age were treated with trypsin and then disentangled into respective cellular tissues.

A suspension of the cellular tissue having 2,000,000 unit cells per ml. was prepared by treating the aforementioned disentangled cellular tissue with a nutrient liquor consisting of Earle's liquor which contains 0.5 percent of hydrolyzed product of lactoalbumine and 20 percent of cattle serum.

A series of the eight aqueous solutions of formaldehyde was prepared by diluting a 37 percent formaldehyde aqueous solution available in the market to an extent of respectively $10^1$, $10^2$, $10^3$, $10^4$, $10^5$, $10^6$, $10^7$ and $10^8$ fold with distilled water.

Each 0.5 ml. of these solutions in test tubes were respectively mixed with 0.5 ml. of the aforementioned suspension of cellular tissue, and the whole was cultivated by slant static cultivation for 48, 96 and 120 hours at the temperature of 37° C. The resulting sheets of the tissue formed on the interior wall of the respective tubes were microscopically inspected under 50 x magnification. A threshold was found at a concentration between $10^4$ and $10^5$ fold dilution; that is, in solutions with the dilutions of from $10^1$ to $10^4$ fold respectively, metamorphic destruction of the sheets were observed, whereas in solutions with the dilutions of from $10^5$ to $10^8$ fold, respectively, no metamorphic destruction of the sheets was found, The threshold means the critical and least concentration of formaldehyde that produces metamorphosis on the tissue.

Similar tests were conducted with respect to further ten (10) known disinfectants listed below along with formalin:

TABLE 1

| (common) Trade Name | Active Ingredient | Abbreviation |
|---|---|---|
| Formalin | Formaldehyde | FM |

| | | |
|---|---|---|
| Carbolic acid | Phenol | CA |
| Ohyalax | 5% aqueous solution of sodium hypochlorite | OX |
| Cresol Soap Liquor | 50% Cresol | CR |
| Banzol-Neo | A mixture of 70.7% of o-dichloro benzene, 7.3% of chlorocresol and 22% of an emulgator | |
| Osvan 10% Benzalconium chloride | | OV |
| Hyamin Liquor | 10% Benzetonium chloride | HY |
| Pacoma | 8% Methyldodecylbenzyltrimethyl ammonium chloride and 2% Methyldodecylxylirenyltrimethyl ammonium chloride | PM |
| Isozin Liquor | Popidon iodide 100 mg./ml. | IS |
| Ovanol 516 | Polyoctylpolyaminoethylglycine 30% | ON |
| Hybiten Digluconate | Pure crystalline power of hybiden digluconate | HB |

Data resulting from the tests are tabulated in table 2 along with the data for formalin.

TABLE 2

| Disinfectants | Duration (hrs.) | Dilutions (fold) | | | | | | | | pH* |
|---|---|---|---|---|---|---|---|---|---|---|
| | | $10^1$ | $10^2$ | $10^3$ | $10^4$ | $10^5$ | $10^6$ | $10^7$ | $10^8$ | |
| (1) FM | 48 | +++ | +++ | +++ | +++ | --- | --- | --- | --- | 5.8–6.7 |
| | 96 | +++ | +++ | +++ | +++ | --- | --- | --- | --- | |
| | 144 | +++ | +++ | +++ | +++ | --- | --- | --- | --- | |
| (2) CA | 48 | +++ | +++ | --- | --- | --- | --- | --- | --- | 6.9–7.2 |
| | 96 | +++ | +++ | --- | --- | --- | --- | --- | --- | |
| | 144 | +++ | +++ | --- | --- | --- | --- | --- | --- | |
| (3) OX | 48 | +++ | +-- | --- | --- | --- | --- | --- | --- | 6.8–7.2 |
| | 96 | +++ | +-- | --- | --- | --- | --- | --- | --- | |
| | 144 | +++ | +-- | --- | --- | --- | --- | --- | --- | |
| (4) CR | 48 | +++ | +++ | --- | --- | --- | --- | --- | --- | 7.0–8.6 |
| | 96 | +++ | +-- | --- | --- | --- | --- | --- | --- | |
| | 144 | +++ | +-- | --- | --- | --- | --- | --- | --- | |
| (5) PZ | 48 | +++ | +++ | --- | --- | --- | --- | --- | --- | 7.1–8.8 |
| | 96 | +++ | +++ | --- | --- | --- | --- | --- | --- | |
| | 144 | +++ | +++ | --- | --- | --- | --- | --- | --- | |
| (6) OV | 48 | +++ | +++ | +++ | +++ | --- | --- | --- | --- | 6.3–6.9 |
| | 96 | +++ | +++ | +++ | +++ | --- | --- | --- | --- | |
| | 144 | +++ | +++ | +++ | +++ | --- | --- | --- | --- | |
| (7) HY | 48 | +++ | +++ | +++ | +++ | --- | --- | --- | --- | 6.6–6.8 |
| | 96 | +++ | +++ | +++ | +++ | --- | --- | --- | --- | |
| | 144 | +++ | +++ | +++ | +++ | --- | --- | --- | --- | |
| (8) PM | 48 | +++ | +++ | +++ | ++- | --- | --- | --- | --- | 6.7–7.0 |
| | 96 | +++ | +++ | +++ | +++ | --- | --- | --- | --- | |
| | 144 | +++ | +++ | +++ | +++ | --- | --- | --- | --- | |
| (9) IS | 48 | +++ | +++ | +-- | --- | --- | --- | --- | --- | 6.5–6.8 |
| | 96 | +++ | +++ | +-- | --- | --- | --- | --- | --- | |
| | 144 | +++ | +++ | --- | --- | --- | --- | --- | --- | |
| (10) ON | 48 | +++ | +±- | --- | --- | --- | --- | --- | --- | 6.7–7.0 |
| | 96 | +++ | ++- | --- | --- | --- | --- | --- | --- | |
| | 144 | +++ | ++- | --- | --- | --- | --- | --- | --- | |
| (11) HB | 48 | +++ | +++ | +++ | +-- | --- | --- | --- | --- | 6.6–6.8 |
| | 96 | +++ | +++ | +++ | +-- | --- | --- | --- | --- | |
| | 144 | +++ | +++ | +++ | +-- | --- | --- | --- | --- | |

NOTE.—*=Measured with Beckmann pH-Meter; +=Positive metamorphic destruction of sheet; −=Negative metamorphic destruction of sheet.

As will be seen from the data given in table 2, the metamorphic destruction on the cellular tissue of testicle of pig is caused solely by the disinfectants under tests at concentrations higher than the range of from $10^2$ to $10^4$ fold of the original stocks.

It is therefore obvious from the data that at least $10^5$ fold dilutions are necessary when the estimation of sterilization powers of FM, OV, HY, PM and HB toward hog cholera virus are contemplated in accordance with the method of the present invention, since some of these disinfectants still exhibit a sufficient level of metamorphic destruction on the sheets of tissue.

B. Determination of Sterilizing Powers of Antiseptics

Eight dilute solutions having 125, 250, 500, 1,000, 2,000, 4,000, 8,000, and 16,000 fold dilutions were prepared from the aforementioned formalin (FM) as a disinfectant.

Each 0.5 ml. of serum of hog cholera virus having $10^6$ poisoning powers were taken in eight groups of test tubes, each group consisting of four test tubes. To the total 32 test tubes were respectively added each 0.5 ml. of the aforementioned eight dilute solutions of the formalin (FM).

The test tubes were held at 37° C. for 2 hours to secure a sufficient and/or probable disinfection. After that time, the contents of the test tubes were diluted with an amount of Earle's nutrient liquor containing 5 percent of cattle serum to result in each a 1,000 fold dilution of the individual concentrations of original dilute solutions lest they should produce metamorphic destruction of the sheets formed in accordance with the procedure mentioned later.

There were thus obtained the second series of the following eight groups of the dilute solutions, each group consisting of four members having equal concentrations.

$1.25 \times 10^5$, $2.50 \times 10^5$, $5.0 \times 10^5$, $1 \times 10^6$, $2 \times 10^6$, $4 \times 10^6$, $8 \times 10^6$ and $1.6 \times 10^7$ To each 0.5 ml. of these second series of the dilute solutions were added 0.5 ml. of the aqueous suspension of cellular tissue same as that employed in the preceding paragraph (Paragraph A), and the contents were cultured for 4 days (96 hrs.) at 37° C. by slant static cultivation. Toward the end of this time, a formation of a perfect sheet of the cellular sheet appeared on each of the interior surface of the respective test tubes.

The liquors were sucked dry from the tubes. Each 0.5 ml. of virus of Newcastle disease having poisoning power of $10^6$ PFU (Plaque Forming Units) were poured on the respective sheets of the cellular tissue. After 4 days (96 hrs.) cultivation with rotation, the status of the sheets were microscopically inspected under 50 x magnification. Results obtained are tabulated in hereinunder-given table 3.

Further series of the tests conducted according to the preceding procedures with respect to the remainder of the aforementioned known disinfectants, i.e., CA, OX, CR, PZ, OV, HY, PM, IS ON and HB. results observed are summarized in table 3 along with the results previously obtained with the disinfectant FM. In table, $ED_{50}$ values are showing a complete 50 percent sterilization of the cultivated hog cholera virus as computed according to the Behrens-Karber method.

present invention is alternately applicable for comparison of the sterilizing powers of various disinfectants for virus of Newcastle disease in the presence of hog cholera virus.

TABLE 3

| Disinfectant | Time (hrs.) | × 125 | × 250 | × 500 | × 1,000 | × 2,000 | × 4,000 | × 8,000 | × 16,000 | $ED_{50}$ |
|---|---|---|---|---|---|---|---|---|---|---|
| 1 FM | 96 | − − − − | − − − − | − − − − | − − − − | + + + + | + + + + | + + + + | + + + + | × 1,410 |
| 2 CA | 96 | + + + + | + + + + | + + + + | + + + + | + + + + | + + + + | + + + + | + + + + | |
| 3 OX | 96 | − − − − | − − − − | − − − − | − − − − | − − − − | + + + + | + + + + | + + + + | × 2,820 |
| 4 CR | 96 | − − − − | + + − − | + + + + | + + + + | + + + + | + + + + | + + + + | + + + + | × 250 |
| 5 PZ | 96 | − − − − | − − − − | + + − − | + + + + | + + + + | + + + + | + + + + | + + + + | × 500 |
| 6 OV | 96 | − − − − | − − − − | − − − − | − − − − | − − − − | − − − − | + + + + | + + + + | × 5,630 |
| 7 HY | 96 | − − − − | − − − − | − − − − | − − − − | − − − − | − − − − | + + + + | + + + + | × 5,630 |
| 8 PM | 96 | − − − − | − − − − | − − − − | − − − − | − − − − | − − − − | − − − − | + + + + | × 11,200 |
| 9 IS | 96 | − − − − | − − − − | + + + − | + + + + | + + + + | + + + + | + + + + | + + + + | × 475 |
| 10 ON | 96 | − − − − | − − − − | − − − − | − − − − | − − − − | + + + + | + + + + | + + + + | × 2,820 |
| 11 HB | 96 | − − − − | − − − − | − − − − | + + + + | + + + + | + + + + | + + + + | + + + + | × 700 |

NOTE.—+ = The presence of active cholera virus; − = The absence of active cholera virus.

From table 3, it is apparent that PM shows most powerful sterilizing activity on the cultivated hog cholera virus as compared with those of the others. The same shows the satisfactory activity even though the stock solution thereof was diluted to 8,000 fold.

The available dilutions of the remainder are depicted as follows:

| Disinfectant | Available Dilutions (fold) |
|---|---|
| OV and HY | 4,000 |
| OX and ON | 2,000 |
| FM | 1,000 |
| HB and PZ | 500 |
| IS | 475 |
| CR | 250 |
| CA | 125 |

As is evident from the above detailed explanation, a reliable volumetric estimation in vitro of the sterilizing power of a given disinfectant on hog cholera virus can be effected according to the method of the present invention. A predetermination of the minimum and still effective concentration of a given disinfectant available for a satisfactory sterilization of hog cholera virus can thus be established. It is, of course, to be understood that the method can also be utilized for the purpose of comparison of the various disinfectants with respect to their relative sterilization power against cholera virus. Furthermore, it should be noted that the method of the present invention is alternately applicable for comparison of the sterilizing powers of various disinfectants for virus of Newcastle disease in the presence of hog cholera virus.

However, it is not intended that this invention should be limited only to the specific example disclosed herein, and various modifications and variations may be employed in practice of the invention without departing the spirit of invention.

What is claimed is:

1. A method for the estimation of the sterilizing power of disinfectants against hog cholera virus which comprises:

a. Preparing a series of solutions of said disinfectant being tested of varying concentrations;

b. Determining the critical concentration of said disinfectant solution at which cellular sheets of hog tissue are not subjected to metamorphic destruction by contacting said sheets of hog tissue with the solutions of varying concentration of a;

c. Preparing a series of disinfectant solutions with concentrations of disinfectant below the critical concentration determined in b and adding equal portions of active hog cholera virus to each of said solutions so that some solutions will be sterile and other will still contain active hog cholera virus;

d. Forming cellular sheets of hog tissue cells on the interior surface of vessels containing the solutions of c by adding equal portions of an aqueous suspension of hog tissue to each of said solutions of c;

e. Inoculating each of the cellular sheets formed in d with the active virus of Newcastle's Disease;

f. Microscopically inspecting the sheets for metamorphic destruction after a suitable incubation time to permit such destruction in order to determine the lowest concentration of disinfectant which is effective to sterilize hog cholera virus.

\* \* \* \* \*